United States Patent
Matsui et al.

(10) Patent No.: US 7,209,342 B2
(45) Date of Patent: Apr. 24, 2007

(54) ELECTRIC DOUBLE LAYER CAPACITOR

(75) Inventors: Tooru Matsui, Fujiidera (JP); Masaki Deguchi, Hirakata (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/242,903

(22) Filed: Oct. 5, 2005

(65) Prior Publication Data

US 2006/0087797 A1    Apr. 27, 2006

(30) Foreign Application Priority Data

Oct. 22, 2004    (JP)    ............................. 2004-307918

(51) Int. Cl.
  *H01G 9/00*    (2006.01)
(52) U.S. Cl. ...................... 361/502; 361/503; 252/62.2
(58) Field of Classification Search ........ 361/502–505; 252/62.2
See application file for complete search history.

(56) References Cited

U.S. PATENT DOCUMENTS 6,469,888 B1 *    10/2002    Otsuki et al. ............... 361/502
2003/0108801 A1    6/2003    Otsuki et al.

FOREIGN PATENT DOCUMENTS

| EP | 1176617 A2 * | 1/2002 |
| EP | 1380569 A1 * | 1/2004 |
| JP | 2001-217155 A | 8/2001 |
| JP | 2001-217156 A | 8/2001 |
| JP | 2001-217157 A | 8/2001 |
| KR | 2003-0063112 A | 7/2003 |

* cited by examiner

*Primary Examiner*—Eric W. Thomas
(74) *Attorney, Agent, or Firm*—McDermott Will & Emery LLP

(57) ABSTRACT

A phosphazene compound and an ionic liquid are added to a non-aqueous electrolyte to provide a less flammable electric double layer capacitor in which decline in storage characteristics under a high temperature and deterioration under a high charging voltage are suppressed.

3 Claims, 1 Drawing Sheet

ELECTRIC DOUBLE LAYER CAPACITOR

FIELD OF THE INVENTION

The present invention relates to an electric double layer capacitor using a non-aqueous electrolyte, especially to an electric double layer capacitor having improved characteristics of electrode reaction with the use of the non-aqueous electrolyte.

BACKGROUND OF THE INVENTION

In electric double layer capacitors using a polarizable electrode for a positive electrode and a negative electrode respectively, charge and discharge under high load is possible due to absorption and desorption of cations and anions at the electrode surfaces during the charge and discharge processes. This is because the polarizable electrodes are made by using powder or fabric of activated carbon having a larger specific surface area. The polarizable electrodes are made by kneading the activated carbon with carbon black as a conductive agent, and a binder, as required, and then molding the kneaded material.

Additionally, by using a non-aqueous electrolyte including a non-aqueous solvent as a solvent for dissolving a supporting salt, a charging voltage of the electric double layer capacitor can be set higher, thereby increasing the energy density of the capacitor.

As for a typical non-aqueous solvent, a cyclic carbonate such as ethylene carbonate (EC), propylene carbonate (PC), or butylene carbonate (BC), and a cyclic ester such as γ-butyrolactone (γ-BL) can be mentioned, for example. The non-aqueous electrolyte is prepared by dissolving a quaternary ammonium salt such as N,N,N,N-tetraethylammonium-tetrafluoroborate (TEA-BF$_4$) or N,N,N-triethyl-N-methylammonium-tetrafluoroborate (TEMA-BF$_4$) in these non-aqueous solvents.

However, due to a high flammability of the non-aqueous electrolyte containing a non-aqueous solvent as a main component, safety for the electric double layer capacitors including such non-aqueous electrolyte is concerned. Additionally, declining reliability of the electric double layer capacitors is becoming a problem, since the non-aqueous solvent is apt to cause a side reaction with an activated carbon or carbon black.

In order to decrease flammability of the non-aqueous electrolyte, there has been proposed to use a phosphazene compound as a non-aqueous solvent, and to admix a cyclic carbonate or a cyclic ester as necessary. For example, Japanese Laid-Open Patent Publication No. 2001-217155 proposes an electrolyte obtained by mixing a quaternary ammonium salt, an organic solvent, and a phosphazene compound having a potential window of 0.5 to 4.5V relative to a lithium reference electrode. Also, in Japanese Laid-Open Patent Publication No. 2001-217156, an electrolyte including 0.5 mol/liter of quaternary ammonium salt, and a phosphazene compound having a conductivity of 2.0 mS/cm or more has been proposed, for example. Further, in Japanese Laid-Open Patent Publication No. 2001-217157, an electrolyte including a quaternary ammonium salt, and a phosphazene compound having a dielectric constant of 15 or more (25° C.) and a viscosity of 20 cP or below has been proposed, for example.

The ammonium salts used in the electrolytes described in each of the above publications are electrolyte salts solid at room temperature typically represented by N,N,N,N-tetraethylammonium-tetrafluoroborate (TEA-BF$_4$).

BRIEF SUMMARY OF THE INVENTION

However, even the non-aqueous electrolytes proposed in each of the above publications had problems in that storage characteristics decline under a high temperature and the electrolyte itself deteriorates under a high charging voltage. The decline in storage characteristics was noticeable when 1 mol or more of salt is dissolved in 1 kg of a solvent. The decline in storage characteristics is probably due to a decomposition of the phosphazene compound. When the phosphazene compound is mixed in an electrolyte, dissociation degree of salt is declined and the salt is decomposed to generate BF$_3$ and the like under a high temperature, thereby causing the decomposition of the phosphazene compound.

On the other hand, the deterioration under a high charging voltage is probably due to an adsorption of phosphazene compound onto a negative electrode, making the adsorbed phosphazene compound prone to reductive decomposition under a negative electrode potential.

In order to prevent the adsorption of the phosphazene compound, increasing the concentration of salt in non-aqueous electrolyte is effective. However, the increase in the salt concentration causes some problems of impracticality, declining the storage characteristics noted above, and increasing the viscosity of non-aqueous electrolyte to induce a decline in conductivity.

Thus, the present invention is made in light of the above problems, and aims to suppress the decline in the storage characteristics under a high temperature and the deterioration under a high charging voltage of a non-aqueous electrolyte, and provide a hardly flammable electric double layer capacitor by using the non-aqueous electrolyte.

In order to solve the above problems, the present invention provides an electric double layer capacitor having a positive electrode, a negative electrode, and a non-aqueous electrolyte, wherein the non-aqueous electrolyte includes a phosphazene compound and an ionic liquid.

Herein, the "ionic liquid" in the present invention refers to an organic salt including an organic cation and an organic anion, the organic salt being in a liquid state under room temperature.

It is preferable that the non-aqueous electrolyte includes at least one of a cyclic or linear carbonate having a C=C unsaturated bond, a cyclic carbonate having a C=O bond and a saturated bond, and a cyclic ester having a C=O bond and a saturated bond.

The electric double layer capacitor of the present invention achieves the following effects: lower flammability is obtained by including a phosphazene compound; and an excellent storage characteristics under a high temperature are obtained and a deterioration under a high charging voltage are suppressed by including an ionic liquid. That is, according to the present invention, an electric double layer capacitor with excellent performance can be provided.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
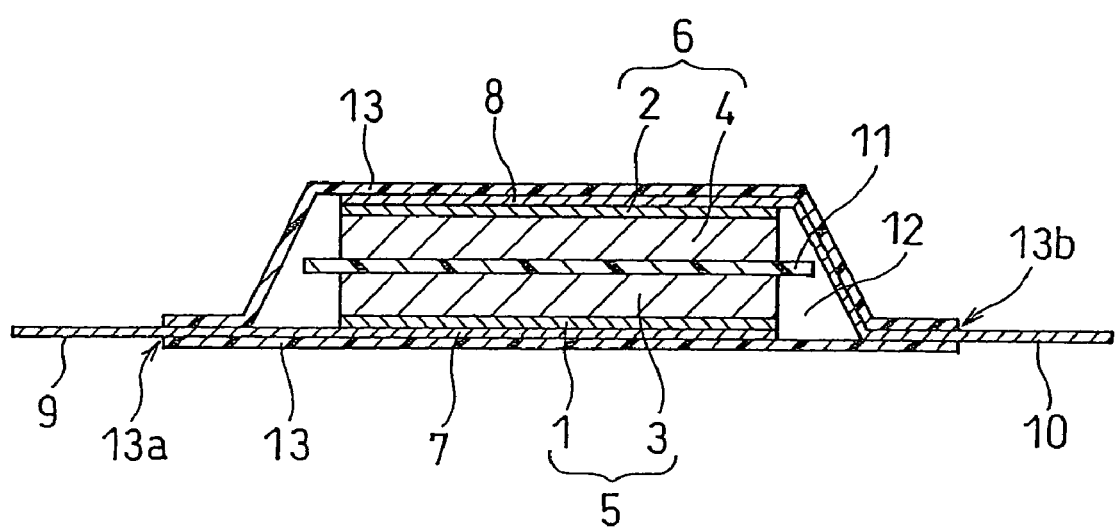
FIG. 1 is a schematic cross section illustrating an embodiment of an electric double layer capacitor of the present invention made in Example.

An electric double layer capacitor of the present invention comprises a positive electrode, a negative electrode, and a non-aqueous electrolyte, wherein the non-aqueous electrolyte includes a phosphazene compound and an ionic liquid. Especially, the present invention is characterized in that the non-aqueous electrolyte includes a non-aqueous solvent including a phosphazene compound with a low flammability, and an ionic liquid which also functions as a supporting salt.

The inclusion of the phosphazene compound decreases flammability of the above non-aqueous electrolyte and the electric double layer capacitor, and further, the ionic liquid enables the effects such as the following.

The ionic liquid is a salt in liquid state under room temperature, and has a greater degree of dissociation. Therefore, the ionic liquid hardly decomposes even under a heat, and suppresses a decomposition of the phosphazene compound as well. Further, the ionic liquid contains a higher concentration of cations and anions, and a decomposition of the phosphazene compound is suppressed since these cations and anions are adsorbed onto electrodes to block an adsorption of the phosphazene compound especially on the negative electrode.

Thus, the inventors of the present invention achieved the present invention, finding that storage characteristics under a high temperature of an electric double layer capacitor can be improved by using the non-aqueous electrolyte obtained by mixing the non-aqueous solvent including a phosphazene compound with an ionic liquid.

Herein, the phosphazene compound refers to a flame-retardant compound including phosphorus and nitrogen as constituent elements. Various phosphazene compounds may be used in the present invention. However, in order to ensure the effects of the present invention, a cyclic or linear phosphazene having not more than 3 phosphorus atoms and not more than 3 nitrogen atoms respectively in one molecule is particularly preferable, among phosphazene compounds.

Specifically, a phosphazene compound represented by chemical formula (1):

$(C_2H_5O)_3-P=N-P(OC_2H_5)_2=O$, a cyclic six membered ring phosphazene compound represented by chemical formula (2):

$(F_2P=N)_3$, a phosphazene compound represented by chemical formula (3):

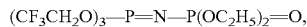
$(CF_3CH_2O)_3-P=N-P(OC_2H_5)_2=O$, and a cyclic six membered ring phosphazene compound represented by chemical formula (4):

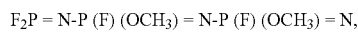
$F_2P = N-P (F) (OCH_3) = N-P (F) (OCH_3) = N,$ may be mentioned, for example.

Further, as for the cation constituting the ionic liquid, ammonium ion, phosphonium ion, and sulfonium ion may be mentioned, for example.

As for the anion constituting the ionic liquid, bis(trifluoromethanesulfonyl)imide ion, tetrafluoroborate ion, hexafluorophosphate ion, and tris(pentafluoroethyl)trifluorophosphate ion may be mentioned, for example. The ionic liquid including chloroaluminate as the anion is not preferable, due to its relatively high corrosiveness.

The ionic liquid preferably comprises a compound including ammonium ion as a cation, since this enables a provision of a device excellent in acid resistance and reduction resistance in electrochemical sense, and chargeable under a high voltage.

A linear quaternary ammonium compound, a pyrrolidinium compound, and a piperidinium compound are especially preferable. To be specific, N,N,N-trimethyl-N-propyl-bis[trifluoromethanesulfonyl]imide (hereinafter also noted as TMPA-TFSI), N-methyl-N-butyl-pyrrolidinium-bis[trifluoromethanesulfonyl]imide (hereinafter also noted as P14-TFSI), N-methyl-N-butyl-pyrrolidinium-tris(pentafluoroethyl)trifluorophosphate (hereinafter also noted as P14-FAP), N,N-diethyl-N-methyl-N-(2-methoxyethyl)ammonium-tetrafluoroborate (hereinafter also noted as DEME-BF$_4$), and N-methyl-N-propyl-piperidinium-bis[trifluoromethanesulfonyl]imide (hereinafter also noted as PP13-TFSI) may be mentioned.

As for the other ionic liquid, N-ethyl-N-methylimidazolium-tetrafluoroborate (hereinafter also noted as EMI-BF$_4$), N-butylpyridinium-tetrafluoroborate (hereinafter also noted as BP-BF$_4$), S-ethyl-S,S-dibutylsulfonium-bis[trifluoromethanesulfonyl]imide (hereinafter also noted as EDBS-TFSI), and P,P,P-trihexyl-P-tetradecylphosphonium-tris(pentafluoroethyl)trifluorophosphate (hereinafter also noted as THtDP-FAP), for example, may also be used.

Herein, the concentration of the above salt in the non-aqueous electrolyte is preferably 1.5 mol/kg or more, and further preferably 2.5 mol/kg or more. A non-aqueous electrolyte excellent in flame retardancy can be obtained when the phosphazene compound and the ionic liquid having flame retardancy are mixed. Further, since an ionic liquid is a salt, the non-aqueous electrolyte with a high concentration of salt can be obtained when such ionic compound is used. The non-aqueous electrolyte of the present invention has enormous merit in that the concentration of salt can be 1.5 mol/kg or more, though a generally used organic electrolyte has a salt concentration of about 1.5 mol/kg at most. That is, when the concentration of salt is 1.5 mol/kg or more, excellent effects can be obtained compared with conventional technology.

Herein, when a carbonate having a C=C unsaturated bond is mixed in the above non-aqueous electrolyte, a coating is formed on the positive electrode and the negative electrode to powerfully block the adsorption of phosphazene compound, thereby effectively suppressing decomposition of the phosphazene compound. The above carbonate may be cyclic or linear.

For a cyclic carbonate having a C=C unsaturated bond, vinylene carbonate (hereinafter also noted as VC), vinylethylene carbonate (hereinafter also noted as Vec), divinylethylene carbonate (hereinafter also noted as DVec), phenylethylene carbonate (hereinafter also noted as Pec), and diphenylethylene carbonate (hereinafter also noted as DPec) may be mentioned, for example. Among these carbonates, vinylethylene carbonate (Vec) and phenylethylene carbonate (Pec) are particularly preferable for the following reasons. Vinylethylene carbonate (Vec) has an exocyclic vinyl group with strong chemical reactivity, and phenylethylene carbonate (Pec) is highly adsorptive to electrodes since it has a phenyl group having a not-localized electron cloud.

For a linear carbonate having a C=C unsaturated bond, methylvinylcarbonate (hereinafter also noted as MVC), ethylvinylcarbonate (hereinafter also noted as EVC), divinylcarbonate (hereinafter also noted as DVC), allylmethylcarbonate (hereinafter also noted as AMC), allylethylcarbonate (hereinafter also noted as AEC), diallylcarbonate (hereinafter also noted as DAC), allylphenylcarbonate (hereinafter also noted as APC), and diphenylcarbonate (hereinafter also noted as DPC) may be mentioned, for example. Among these carbonates, diallylcarbonate (DAC), allylphenylcarbonate (APC), and diphenylcarbonate (DPC) are preferable for the following reasons. Diallylcarbonate (DAC) and allylphenylcarbonate (APC) have a vinyl group with strong chemical reactivity, and allylphenylcarbonate (APC) and diphenylcarbonate (DPC) have a phenyl group which is highly adsorptive relative to electrodes.

It is preferable that at least one compound from a cyclic carbonate having a C=O bond and a saturated bond, and a cyclic ester having a C=O bond and a saturated bond is further mixed in the above non-aqueous electrolyte. This is because salt dissociation of the ionic liquid is accelerated and further, decomposition of the phosphazene compound is remarkably suppressed when the above compound is added to the non-aqueous electrolyte. For a cyclic carbonate or a cyclic ester which shows such actions and effects, ethylene carbonate (hereinafter also noted as EC), propylene carbonate (hereinafter also noted as PC), butylene carbonate (hereinafter also noted as BC), and γ-butyrolactone (hereinafter also noted as γ-BL) may be mentioned, for example.

A conventionally known compound or additive may be added to the above non-aqueous electrolyte, to the extent that will not degrade the effects of the present invention. For example, a linear carbonate may be added, in order to decrease the viscosity of the non-aqueous electrolyte. Also, a polymer such as polyethylene oxide may be added, in order to decrease leakage of electrolyte, for example.

The present invention is described further in detail in the following by referring to Examples, but the present invention is not limited thereto.

1. Comparison of Ionic Liquid and Conventional Ammonium Salt

EXAMPLE 1 AND COMPARATIVE EXAMPLE 1

A non-aqueous electrolyte of the present invention was prepared by mixing a compound represented by chemical formula (1): $(C_2H_5O)_3-P=N-P(OC_2H_5)_2=O$, i.e. a phosphazene compound, and N,N-diethyl-N-methyl-N-(2-methoxyethyl)ammonium-tetrafluoroborate (DEME-BF$_4$), i.e., an ionic liquid, in a mole ratio of 6:1.

The above non-aqueous electrolyte was placed in a container made of tetrafluoroethylene-perfluoroalkylvinylether copolymer resin (hereinafter also noted as PFA) and hermetically sealed. The container was placed in an aluminum laminate bag and then the bag was sealed.

Afterwards, the non-aqueous electrolyte was stored at 90° C. for 10 days, and its changes in color tone were examined. As a result, the non-aqueous electrolyte was found to have a light orange color, showing almost no change.

Then, an electric double layer capacitor shown in FIG. 1 was assembled by using the above non-aqueous electrolyte, based on the steps explained below. FIG. 1 is a schematic cross sectional view showing a structure of an embodiment of an electric double layer capacitor of the present invention made in this Example.

The electric double layer capacitor shown in FIG. 1 comprises a polarizable electrode 5 and a polarizable electrode 6. The polarizable electrode 5 is formed with an active material layer 3, a current collector 1 made of an aluminum foil, a current collecting plate 7 made of an aluminum, and a lead 9. The polarizable electrode 6 is formed with an active material layer 4, a current collector 2 made of an aluminum foil, a current collecting plate 8 made of an aluminum, and a lead 10. A separator 11 is provided between the polarizable electrode 5 and the polarizable electrode 6.

First, a mixture was obtained by mixing activated carbon powder made of a phenolic resin having a specific surface area of 1700 m$^2$/g, acetylene black (conductive material), an ammonium salt of carboxymethyl cellulose (binder), water (dispersant), and methanol (dispersant), in a weight ratio of 10:2:1:100:40.

The obtained mixture was applied onto a surface of the current collector 1 having a thickness of 20 μm and made of an aluminum foil, and then dried to form the active material layer 3 having a thickness of 80 μm. The current collector 1 made of an aluminum foil having the active material layer 3 was cut to give a size of 35 mm×35 mm.

On an assembly of the active material layer 3 and the current collector 1 made of an aluminum foil, the current collecting plate 7 made of aluminum was ultrasonically welded on the current collector 1 side. Then, the lead 9 made of aluminum was ultrasonically welded to the current collecting plate 7 made of aluminum to obtain the polarizable electrode 5. The polarizable electrode 6 was obtained as well in the same manner.

A separator 11 of non-woven fabric made of polypropylene was disposed between the polarizable electrodes 5 and 6 to face the active material layers 3 and 4, and then fixed with a tape so that the leads 9 and 10 extend to the opposite directions, to obtain an electrode plate group 12.

Then, the electrode plate group 12 was accommodated in a tube 13 comprising a laminate film formed with an aluminum foil and a polypropylene film. The lead 9 is drawn out from a first opening 13a of the tube 13, and the lead 9 and the tube 13 were thermally welded to seal the first opening 13a.

Subsequently, the lead 10 was drawn out from a second opening 13b of the tube 13, and the above non-aqueous electrolyte was charged from the second opening 13b. After gas was evacuated by reducing the pressure (−750 mmHg, 10 seconds), the second opening 13b and the lead 10 were thermally welded under the reduced pressure and the second opening 13b was sealed, thereby producing an electric double layer capacitor 1A of the present invention (Example 1).

On the other hand, a non-aqueous electrolyte was prepared in the same manner as the Example 1, except that N,N,N,N-tetraethylammonium-tetrafluoroborate (TEA-BF$_4$) which is solid under room temperature was used instead of the ionic liquid.

The changes in color of the non-aqueous electrolyte was examined in the same manner as Example 1, and it was found that the color of the electrolyte was changed from a light orange to dark orange, to almost black.

This non-aqueous electrolyte was used to prepare a comparative electric double layer capacitor 1B in the same manner as Example 1 (Comparative Example 1).

[Evaluative Test]

The electric double layer capacitors 1A and 1B prepared in Example 1 and Comparative Example 1 were compared in terms of storage characteristics under a high temperature. First, a set of charge and discharge was repeated at a constant current of 2 mA and a voltage range of 0 to 2.4V under a temperature of 20° C. to check the capacity of the electric double layer capacitors 1A and 1B.

Then, after keeping the temperature of 90° C. while applying a voltage of 2.4V for a certain period of time, the electric double layer capacitors 1A and 1B were charged and discharged again at 20° C., to check the capacity after the storage. The capacity ratio of the electric double layer capacitor 1B of Comparative Example 1 relative to the electric double layer capacitor 1A of Example 1 is shown in Table 1.

TABLE 1

|  | Before Storage | After 1 day | After 3 days | After 7 days | After 14 days | After 30 days |
| --- | --- | --- | --- | --- | --- | --- |
| Capacity Ratio | 0.95 | 0.86 | 0.78 | 0.69 | 0.64 | 0.61 |

Table 1 shows that the electric double layer capacitor 1A in Example 1 of the present invention is superior in terms of the storage characteristics under a high temperature compared with the electric double layer capacitor 1B of Comparative Example 1. That is, the results show that the usage of the ionic liquid is essential to obtain the effects of the present invention.

EXAMPLE 2 AND COMPARATIVE EXAMPLE 2

The non-aqueous electrolyte prepared in the same manner as Example 1 was stored at a temperature of 90° C. for 10 days in advance. Subsequently, this non-aqueous electrolyte was used to assemble an electric double layer capacitor 2A of the present invention in the same manner as Example 1 (Example 2).

Also, the non-aqueous electrolyte prepared in the same manner as Comparative Example 1 was stored at a temperature of 90° C. for 10 days in advance. Subsequently, this non-aqueous electrolyte was used to assemble an electric double layer capacitor 2B for comparison in the same manner as Comparative Example 1 (Comparative Example 2).

Storage characteristics under a high temperature were compared in the same manner as Example 1 and Comparative Example 1 by using the electric double layer capacitor 2A of Example 2 and the electric double layer capacitor 2B of Comparative Example 2. The capacity ratio of the electric double layer capacitor 2B of Comparative Example 2 relative to the electric double layer capacitor 2A of Example 2 is shown in Table 2.

TABLE 2

|  | Before Storage | After 1 day | After 3 days | After 7 days | After 14 days | After 30 days |
| --- | --- | --- | --- | --- | --- | --- |
| Capacity Ratio | 0.79 | 0.71 | 0.63 | 0.55 | 0.51 | 0.48 |

Table 2 shows that the deterioration of the non-aqueous electrolyte is suppressed in the electric double layer capacitor 2A in Example 2 of the present invention. This is reflected in the degree of color change of the non-aqueous electrolyte when stored at a high temperature, and in capacitor characteristics.

2. Examination of Ionic Liquid Variation

EXAMPLES 3 TO 11 AND COMPARATIVE EXAMPLE 3

A non-aqueous electrolyte was obtained by mixing an ionic liquid, and a cyclic six-membered ring phosphazene compound represented by chemical formula (2): $(F_2P=N)_3$ in a mole ratio of 1:0.1. For the ionic liquid, N-ethyl-N-methylimidazolium-tetrafluoroborate (EMI-$BF_4$), N-butylpyridinium-tetrafluoroborate (BP-$BF_4$), N,N-diethyl-N-methyl-N-(2-methoxyethyl)ammonium-tetrafluoroborate (DEME-$BF_4$), N,N,N-trimethyl-N-propyl-bis[trifluoromethanesulfonyl]imide (TMPA-TFSI), N-methyl-N-butylpyrrolidinium-bis[trifluoromethanesulfonyl]imide (P14-TFSI), N-methyl-N-butylpyrrolidinium-tris(pentafluoroethyl)trifluorophosphate (P14-FAP), N-methyl-N-propylpiperidinium-bis[trifluoromethanesulfonyl]imide (PP13-TFSI), S-ethyl-S,S-dibutylsulfonium-bis[trifluoromethanesulfonyl]imide (EDBS-TFSI), and P,P,P-trihexyl-P-tetradecylphosphonium-tris(pentafluoroethyl)trifluorophosphate (THtDP-FAP) were used, respectively.

The electric double layer capacitors 3A to 11A of the present invention were made in the same manner as Example 1 by using the obtained non-aqueous electrolytes (Examples 3 to 11).

Herein, the non-aqueous electrolyte obtained by mixing TMPA-TFSI and the above phosphazene compound in a mole ratio of 1:0.1 had a salt concentration of 2.5 mol/kg, for example.

On the other hand, a non-aqueous electrolyte was obtained by mixing ethylene carbonate (EC), N,N,N-triethyl-N-methyl-bis[trifluoromethanesulfonyl]imide (TEMA-TFSI), and the phosphazene compound represented by the above chemical formula (2) in a mole ratio of 3:1:0.1. N,N,N-triethyl-N-methyl-bis[trifluoromethanesulfonyl] imide (TEMA-TFSI) is a solid ammonium salt at room temperature and is insoluble in the phosphazene compound represented by the above chemical formula (2). This non-aqueous electrolyte had a salt concentration of 1.5 mol/kg.

An electric double layer capacitor 3B for comparison was made in the same manner as Example 3 except that the non-aqueous electrolyte thus prepared was used (Comparative Example 3).

[Evaluative Test]

Charge characteristics under a high voltage of the electric double layer capacitors 3A to 11A obtained in the above Examples 3 to 11, and of the electric double layer capacitor 3B obtained in Comparative Example 3 were compared by the method shown below.

First, the above electric double layer capacitors were repeatedly charged and discharged at a temperature of 20° C. and a constant current of 2 mA with a voltage range of 0 to 2.4 V and then the capacities was checked. These capacities were set as X.

Then, the capacitors were stored for a week at a temperature of 20° C. while the voltage of 2.4 V was being applied. Subsequently, charge and discharge were conducted with a voltage range of 0 to 2.4 V again and then the capacities of the electric double layer capacitors were checked. These capacities were set as Y.

Further, the electric double layer capacitors after checking the capacity with a voltage range of 0 to 2.4 V were charged until reaching 2.8 V. The capacitors were stored for a week at a temperature of 20° C. while the voltage of 2.8 V was being applied. Subsequently, the electric double layer capacitors were charged and discharged again at a voltage range of 0 to 2.4 V, and the capacities were checked. These capacities were set as Z.

Then, Z/Y{=(Z/X)/(Y/X)} was obtained by using deterioration ratio Y/X of before and after the storage at the constant voltage of 2.4 V and deterioration ratio Z/X of before and after the storage at the constant voltage of 2.8 V. The obtained values are shown in Table 3.

TABLE 3

| | Ionic Liquid | Z/Y |
|---|---|---|
| Example 3 | EMI-BF$_4$ | 0.62 |
| Example 4 | BP-BF$_4$ | 0.59 |
| Example 5 | DEME-BF$_4$ | 0.76 |
| Example 6 | TMPA-TFSI | 0.88 |
| Example 7 | P14-TFSI | 0.83 |
| Example 8 | P14-FAP | 0.79 |
| Example 9 | PP13-TFSI | 0.84 |
| Example 10 | EDBS-TFSI | 0.67 |
| Example 11 | THtDP-FAP | 0.71 |
| Comp. Example 3 | EC/TEMA-TFSI (Ammonium Salt) | 0.41 |

Table 3 shows that any of the electric double layer capacitors 3A to 11A of Examples 3 to 11 has a higher stability under a high charging voltage relative to the electric double layer capacitor 3B of Comparative Example 3. Particularly, a linear quaternary ammonium compound (Example 6), a pyrrolidinium compound (Examples 7 and 8), and a piperidinium compound (Example 9) showed preferable results.

3. Examination of Variations of Carbonate Having C═C Unsaturated Bond

EXAMPLES 12 TO 24

A non-aqueous electrolyte was obtained by mixing N,N,N-trimethyl-N-propyl-bis[trifluoromethanesulfonyl]imide (TMPA-TFSI) as an ionic liquid, a phosphazene compound represented by the above chemical formula (2), and a cyclic or linear carbonate having a C═C unsaturated bond in a mole ratio of 1:0.1:0.01. For the cyclic carbonate having a C═C unsaturated bond, vinylene carbonate (VC), vinylethylene carbonate (Vec), divinylethylene carbonate (DVec), phenylethylene carbonate (Pec), and diphenylethylene carbonate (DPec) were used respectively. For the linear carbonate having a C═C unsaturated bond, methylvinylcarbonate (MVC), ethylvinylcarbonate (EVC), divinylcarbonate (DVC), allylmethylcarbonate (AMC), allylethylcarbonate (AEC), diallylcarbonate (DAC), allylphenylcarbonate (APC), and diphenylcarbonate (DPC) were used, respectively.

Electric double layer capacitors 12A to 24A of the present invention were made in the same manner as Example 3 by using these non-aqueous electrolytes, and stability under a high charging voltage was evaluated for these electric double layer capacitors in the same manner as Example 3.

The results are shown in Table 4, with the result of Example 6 in which a compound having a C═C unsaturated bond was not added.

TABLE 4

| | Carbonate Having C═C Unsaturated Bond | Z/Y |
|---|---|---|
| Example 12 | VC | 0.91 |
| Example 13 | Vec | 0.96 |
| Example 14 | DVec | 0.92 |
| Example 15 | Pec | 0.95 |
| Example 16 | DPec | 0.93 |
| Example 17 | MVC | 0.87 |
| Example 18 | EVC | 0.89 |
| Example 19 | DVC | 0.90 |
| Example 20 | AMC | 0.92 |
| Example 21 | AEC | 0.92 |
| Example 22 | DAC | 0.94 |
| Example 23 | APC | 0.95 |
| Example 24 | DPC | 0.93 |
| Example 6 | — | 0.88 |

Table 4 shows that any of the electric double layer capacitors in Examples 12 to 24 has a higher stability under a high charging voltage relative to the capacitor in Example 6. Particularly, Table 4 shows that the cyclic carbonates having a C═C unsaturated bond such as Vec and Pec, and the linear carbonates having a C═C unsaturated bond such as DAC, APC, and DPC are preferable.

4. Examination of Variations of Compound Having C═O Bond and Saturated Bond

EXAMPLES 25 TO 28

A non-aqueous electrolyte was obtained by mixing the following in a mole ratio of 1:0.1:0.01:0.1: N-methyl-N-propylpiperidinium-bis[trifluoromethanesulfonyl]imide (PP13-TFSI) as an ionic liquid; a phosphazene compound represented by the above chemical formula (2); vinylethylene carbonate (Vec) as a carbonate having a C═C unsaturated bond; a cyclic carbonate having a C═O bond and a saturated bond, or a γ-butyrolactone (γ-BL) as a cyclic ester having a C═O bond and a saturated bond. For the cyclic carbonate having a C═O bond and a saturated bond, ethylene carbonate (EC), propylene carbonate (PC), and butylene carbonate (BC) were used respectively.

Electric double layer capacitors 25A to 28A of the present invention were made in the same manner as Example 12 by using these non-aqueous electrolytes.

EXAMPLE 29

An electric double layer capacitor 29A of the present invention was made in the same manner as Example 25 except that Vec was not added to the non-aqueous electrolyte.

EXAMPLE 30

An electric double layer capacitor 30A of the present invention was made in the same manner as Example 25 except that a compound having a C═O bond and a saturated bond was not added to the non-aqueous electrolyte.

EXAMPLE 31

An electric double layer capacitor 31A of the present invention was made in the same manner as Example 25 except that Vec and a compound having a C═O bond and a saturated bond were not added to the non-aqueous electrolyte.

The storage characteristics under a high temperature of the electric double layer capacitors made in Examples 25 to 31 were evaluated in the same manner as Example 1. The storage characteristics under a high temperature at 30th day (retention rate (%)) are shown in Table 5.

TABLE 5

|  | Ionic Liquid | Phosphazene Compound | Carbonate Having C=C Unsaturated Bond | Compound Having C=O Bond and Saturated Bond | Retention Rate (%) |
|---|---|---|---|---|---|
| Ex. 25 | PP13-TFSI | $(F_2P=N)_3$ | Vec | EC | 91 |
| Ex. 26 | PP13-TFSI | $(F_2P=N)_3$ | Vec | PC | 88 |
| Ex. 27 | PP13-TFSI | $(F_2P=N)_3$ | Vec | BC | 88 |
| Ex. 28 | PP13-TFSI | $(F_2P=N)_3$ | Vec | γ-BL | 90 |
| Ex. 29 | PP13-TFSI | $(F_2P=N)_3$ | — | EC | 82 |
| Ex. 30 | PP13-TFSI | $(F_2P=N)_3$ | Vec | — | 85 |
| Ex. 31 | PP13-TFSI | $(F_2P=N)_3$ | — | — | 76 |

Table 5 shows that the electric double layer capacitors using the non-aqueous electrolyte in which at least one of a cyclic carbonate having a C=C unsaturated bond, and a compound having a C=O bond and a saturated bond (cyclic carbonate or cyclic ester) is further mixed have more superior storage characteristics under a high temperature compared with the electric double layer capacitor using the non-aqueous electrolyte only including an ionic liquid and a phosphazene compound.

As for the retention rate after the storage under a high temperature, which shows storage characteristics under a high temperature, the results show that further superior effects can be obtained when the cyclic carbonate having a C=C unsaturated bond was used, compared with the case when the cyclic carbonate having a C=O bond and a saturated bond was used.

5. Examination on the Amount of the Carbonate Having a C=C Unsaturated Bond to be Mixed

EXAMPLES 32 TO 39

Non-aqueous electrolytes were obtained by mixing N,N,N-trimethyl-N-propyl-bis[trifluoromethanesulfonyl]imide (TMPA-TFSI) as an ionic liquid, a phosphazene compound represented by chemical formula (3): $(CF_3CH_2O)_3$—P=N—P$(OC_2H_5)_2$=O, vinylethylene carbonate (Vec) as a carbonate having a C=C unsaturated bond, and ethylene carbonate (EC) as a cyclic ester having a C=O bond and a saturated bond in a mole ratio of 1:0.05:X:1.0, where X is 001 to 2.0.

Electric double layer capacitors 32A to 39A of the present invention were made in the same manner as Example 25 by using these non-aqueous electrolytes.

[Evaluative Test]

The internal resistance at 1 kHz of these electric double layer capacitors of Examples 32 to 29 was measured with an open circuit after a charge at 2.4 V and under a voltage amplitude of 5 mv. Additionally, these electric double layer capacitors were charged at a temperature of 20° C. until reaching 2.8 V and stored for a week. Afterwards, generated gas was removed from the electric double layer capacitors to measure the gas amount. The results are shown in Table 6. In Table 6, the phosphazene compound represented by chemical formula (3) is shown as Compound 3.

TABLE 6

|  | TMPA-TFSI:Compound 3:Vec:EC (mole ratio) | Vec (mol %) | Internal Resistance (Ω) | Amount of Gas (ml) |
|---|---|---|---|---|
| Ex. 32 | 1:0.05:0.001:1 | 0.05 | 1.00 | 2.38 |
| Ex. 33 | 1:0.05:0.01:1 | 0.49 | 1.01 | 0.24 |
| Ex. 34 | 1:0.05:0.05:1 | 2.38 | 1.02 | 0.21 |
| Ex. 35 | 1:0.05:0.1:1 | 4.65 | 1.04 | 0.20 |
| Ex. 36 | 1:0.05:0.2:1 | 8.89 | 1.09 | 0.22 |
| Ex. 37 | 1:0.05:0.5:1 | 19.61 | 1.26 | 0.21 |
| Ex. 38 | 1:0.05:1:1 | 32.79 | 1.68 | 0.23 |
| Ex. 39 | 1:0.05:2:1 | 49.38 | 2.27 | 0.22 |

Table 6 shows that an internal resistance of electric double layer capacitor increases when Vec ratio is higher. On the other hand, when the Vec ratio is lower, the amount of gas generated in electric double layer capacitors increase. From these results, it is clear that the preferable range of the carbonate having a C=C unsaturated bond such as Vec to be added is about 0.5 to 20 mol % relative to the total of the non-aqueous electrolyte (Examples 32 to 37).

6. Examination of the Amount of the Compound Having a C=O Bond and a Saturated Bond to be Mixed

EXAMPLES 40 TO 47

Non-aqueous electrolytes were obtained by mixing N,N,N-trimethyl-N-propyl-bis[trifluoromethanesulfonyl]imide (TMPA-TFSI) as an ionic liquid, a phosphazene compound represented by chemical formula (3): $(CF_3CH_2O)_3$—P=N—P$(OC_2H_5)_2$=O, vinylethylene carbonate (Vec) as a carbonate having a C=C unsaturated bond, and ethylene carbonate (EC) as a cyclic ester having a C=O bond and a saturated bond in a mole ratio of 1:0.05:0.05:X, where X is 0.1 to 10.

Electric double layer capacitors 40A to 47A of the present invention were made in the same manner as Example 32 by using these non-aqueous electrolytes.

The internal resistance at 1 kHz of the electric double layer capacitors obtained in Examples 40 to 47 was measured in the same manner as Example 32. Also, a bunched up glass wool was impregnated with the non-aqueous electrolyte used for these electric double layer capacitors and heated with a burner to check the flammability. The results are shown in Table 7. Numeral "1" is marked when the glass wool was not burned, numeral "2" is marked when smoke was produced, and numeral "3" is marked when the glass wool was burned. In Table 7, the phosphazene compound represented by chemical formula (3) is shown as Compound 3.

TABLE 7

|  | TMPA.TFSI:Compound 3:Vec:EC (mole ratio) | EC (mol %) | Internal Resistance (Ω) | Flammability |
|---|---|---|---|---|
| Ex. 40 | 1:0.05:0.05:0.1 | 8.00 | 1.00 | 1 |
| Ex. 41 | 1:0.05:0.05:0.2 | 14.81 | 0.97 | 1 |
| Ex. 42 | 1:0.05:0.05:0.5 | 30.30 | 0.90 | 1 |
| Ex. 43 | 1:0.05:0.05:1.0 | 46.51 | 0.91 | 1 |
| Ex. 44 | 1:0.05:0.05:2.0 | 63.49 | 0.96 | 2 |
| Ex. 45 | 1:0.05:0.05:5.0 | 81.30 | 1.22 | 3 |
| Ex. 46 | 1:0.05:0.05:7.0 | 85.89 | 1.63 | 3 |
| Ex. 47 | 1:0.05:0.05:10.0 | 89.69 | 2.35 | 3 |

Table 7 shows that the internal resistance of the electric double layer capacitor initially decreases when the ratio of EC having a C=O bond and a saturated bond is increased. Then, the non-aqueous electrolyte becomes flammable when the ratio of EC to be mixed is further increased. Thus, the appropriate range of EC amount to be added is about 10 to 70 mol % relative to the total of the non-aqueous electrolyte (Examples 40 to 44).

As is clear from the above, the electric double layer capacitor using the non-aqueous electrolyte of the present invention is highly reliable, since the flame-retardancy of the non-aqueous electrolyte is maintained, while storage characteristics under a high temperature and stability under a high charging voltage can be improved by mixing in the phosphazene compound and the ionic liquid.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electric double layer capacitor comprising a positive electrode, a negative electrode, and a non-aqueous electrolyte, wherein said non-aqueous electrolyte includes a phosphazene compound and an ionic liquid, wherein the ionic liquid is any one from the group consisting of a linear guaternary ammonium compound, a pyrrolidinium compound and a piperidinium compound, wherein any substituent group which is bonded to a N atom in a compound thereof is a linear alkyl group.

2. The electric double layer capacitor in accordance with claim 1, wherein said non-aqueous electrolyte includes a cyclic or linear carbonate having a C=C unsaturated bond.

3. The electric double layer capacitor in accordance with claim 1, wherein said non-aqueous electrolyte includes at least one of a cyclic carbonate having a C=O bond and a saturated bond, and a cyclic ester having a C=O bond and a saturated bond.

* * * * *